Patented Apr. 30, 1940

2,198,641

UNITED STATES PATENT OFFICE 2,198,641

PROCESS FOR PREPARING WHITE LEAD

Edward D. Turnbull, Clarks Summit, Pa., assignor to The Glidden Company, Cleveland, Ohio, a corporation of Ohio No Drawing. Application January 19, 1938, Serial No. 185,653

5 Claims. (Cl. 134—72)

This invention relates to white lead, and more particularly to that form of white lead commonly known as "French process" white lead, prepared by precipitating basic lead carbonate from a solution of basic lead acetate. Specifically, this invention deals with a treatment for such white lead whereby improved results are obtained in the ceramic industry, comprising the treatment of the pigment with an alkali carbonate under definite conditions.

White lead as made by the old French process of passing carbon dioxide into basic lead acetate solution, has always been of poor quality, from the point of view of hiding power and tinting strength. More recently, I have developed a process of making white lead by controlling the reaction conditions, as disclosed in my co-pending application Serial No. 83,275, filed June 3, 1936, now Patent No. 2,115,090, granted April 26, 1938, whereby a satisfactory pigment is obtained by this method. The control results in the production of a pigment while the solution is on the acid side of the neutral point, at a pH of below 6.0; the pigment has an acid pH. Other white leads made with the final pH of the solution on the acid sides show similar acidity.

When used in the ceramic industry, in making glazes, it has been discovered that these acid white leads produce glaze slips of much heavier consistency than produced by white leads which have their pH above 7.0 made by the electrical and other processes. An attempt was made to obtain improved viscosities by treating the pulp with alkali before filtration, thus increasing the pH of the pigment and reducing the viscosity of the slip. This attempt, however, gave unsatisfactory results, in that the desired viscosities are not obtained without the use of detrimental quantities of alkali.

Further investigation of the problem resulted in the discovery that the acid-precipitated white leads contain small quantities of lead acetate, either absorbed in the pigment or adsorbed on the surface of the particles, and that this lead acetate is responsible for the high viscosity imparted to glaze slips. In view of the character of the union between the lead acetate and the pigment, reaction does not occur rapidly in the slurry of the pulp, between the added alkali and the adherent lead acetate, so that mere adjustment of the alkalinity does not produce the desirable low viscosity with sufficiently small quantities of alkali. I have discovered that if an alkali carbonate be added to the filter cake, and the mixture dried while subject to agitation, the carbonate is adsorbed onto the pigment, or absorbed by it, in the same manner as the lead acetate, and that the surface acidity of the pigment is destroyed by reaction between the lead acetate and the alkali carbonate. The resultant pigment gives desirable low viscosity ceramic glaze slips.

As a specific example of my invention, I precipitated white lead from a basic lead acetate solution in the conventional manner, the final pH of the solution being 5.9. The precipitate was treated in a Dorr thickener to prepare a filterable slurry; this was put through an Oliver suction filter, and a batch of filter cake was obtained having 300 pounds of white lead together with 517 pounds of water. The batch was charged into a vacuum drier equipped with an agitator, and 1½ pounds of anhydrous sodium carbonate were added. The drier was allowed to run at 180° F. under a vacuum of 20 inches for 15 hours; the dried pigment which came out was of a character which produced satisfactory low viscosity ceramic glaze slips.

The use of a vacuum drier in this connection is of considerable importance. Working with either treated or untreated white lead, superior results are obtained, as to viscosity of slip, by the use of a vacuum drier, the glaze slips of air dried material being considerably more viscous than vacuum dried material of the same pH. Agitation during the drying is also important, as improved results are obtained by its use.

Other white leads precipitated from lead acetate solutions with a final acid concentration are affected similarly by this treatment, as are white leads made by other processes which yield a final acidity.

The amount of alkaline carbonate added should be kept at a low figure, as excess alkali is undesirable. I find about .4 or .5% to be a good figure in ordinary practice; amounts over 1.0% should be avoided, as the alkali is then present in too substantial concentration.

In the claims, the term "absorbed" means absorbed in the interstices, or adsorbed on the surface.

I claim:

1. The process of treating basic carbonate white lead containing absorbed or adsorbed lead acetate on the particles of basic carbonate white lead, which comprises incorporating a minor amount of anhydrous alkali carbonate sufficient to neutralize the lead acetate into a water wet filter cake of the white lead, and drying the filter cake with agitation, whereby the lead acetate is converted into lead carbonate.

2. The process of treating basic carbonate white lead containing absorbed or adsorbed lead acetate on the particles of basic carbonate white lead which comprises incorporating a minor amount of anhydrous alkali carbonate sufficient to neutralize the lead acetate into a water wet filter cake of the white lead, and vacuum drying the filter cake with agitation whereby the lead acetate is converted into lead carbonate.

3. The process of treating basic carbonate white lead containing absorbed or adsorbed lead acetate on the particles of the basic carbonate white lead, which comprises incorporating an anhydrous alkali carbonate into a water wet filter cake of the white lead in amount up to 1% by weight of the white lead sufficient to neutralize the lead acetate, and drying the filter cake with agitation whereby the lead acetate is converted into lead carbonate.

4. The process of claim 1 in which the alkali carbonate is sodium carbonate.

5. The process of treating basic carbonate white lead containing absorbed or adsorbed lead acetate on the particles of the basic carbonate white lead, which comprises incorporating an anhydrous alkali carbonate into a water wet filter cake of the white lead in amount up to 1% by weight of the white lead sufficient to neutralize the lead acetate and vacuum drying the filter cake with agitation whereby the lead acetate is converted into lead carbonate.

EDWARD D. TURNBULL.